June 17, 1947.  D. HEYER  2,422,196

UNITARY VARIABLE RATIO MECHANISM

Filed Sept. 29, 1943  3 Sheets-Sheet 1

DON HEYER, INVENTOR.

BY

ATTORNEY.

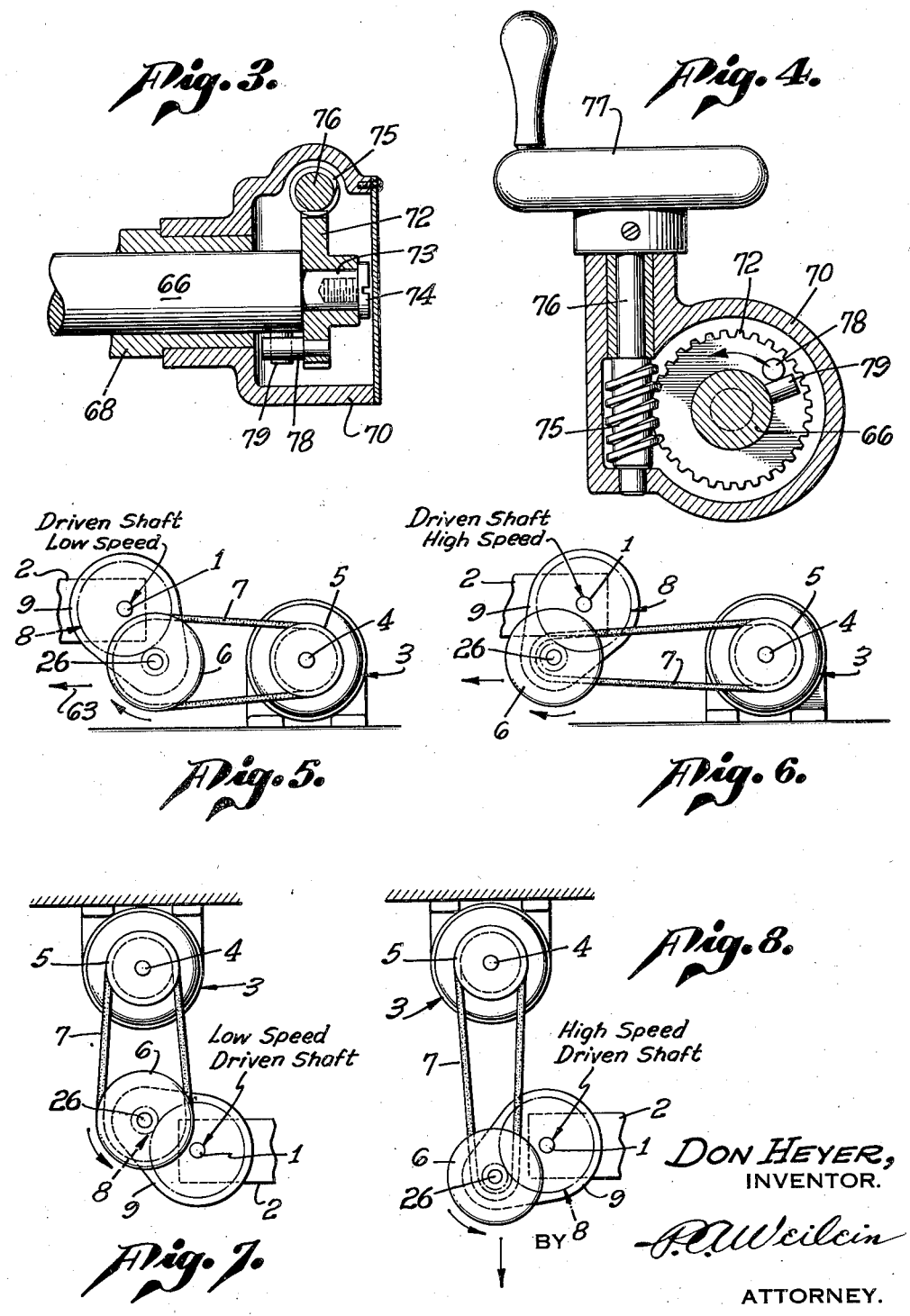

June 17, 1947. D. HEYER 2,422,196

UNITARY VARIABLE RATIO MECHANISM

Filed Sept. 29, 1943 3 Sheets-Sheet 3

DON HEYER,
INVENTOR.

BY

ATTORNEY.

Patented June 17, 1947

2,422,196

UNITED STATES PATENT OFFICE 2,422,196

UNITARY VARIABLE RATIO MECHANISM

Don Heyer, Los Angeles, Calif.

Application September 29, 1943, Serial No. 504,277

16 Claims. (Cl. 74—230.17)

This invention relates to variable ratio transmissions including a pair of belt connected pulley structures, at least one of which has a variable diameter, and in which means are provided for altering the center distance between the pulleys, variation in the center distance causing a change in diameter of the variable diameter pulley and thus altering the ratio of the transmission. More particularly, the invention relates to a unitary structure adapted for mounting on either the driving or the driven shaft, and incorporating the variable diameter pulley structure as well as the means for varying the center distance.

It is an object of this invention to provide a unit which can be mounted readily on either a driving or a driven shaft, including a pulley adapted to cooperate with a pulley on the other shaft, to form a variable ratio transmission.

It is another object of this invention to provide a self-contained unitary structure adapted for mounting on a shaft, incorporating a variable diameter pulley and means for varying the center distance between said pulley and the cooperating pulley, whereby to form a variable ratio transmission without the need of other additions or changes in the drive.

It is another object of the invention to provide a mechanism adapted for use in a variable ratio transmission whereby the driving torque tends to alter the center distance between the pulleys.

It is another object of this invention to provide a mechanism adapted for use in a variable ratio transmission whereby the driving torque tends to increase the center distance between the pulleys, and control means is provided to oppose such increase and to decrease the center distance.

In variable ratio transmissions including a variable diameter pulley wherein a change in center distance between the driving and the driven pulley is relied on to alter the effective diameter of the variable diameter pulley, it is usual to provide a separate mechanism to alter the center distance and thus control the transmission ratio, such as a movable support for one of the shafts and the associated pulley. For a variable ratio drive utilizing a V-belt to be efficient, the belt must operate at a high speed. Hence, some type of speed reducer is frequently employed in the transmission to obtain the proper speed. It is accordingly still another object of this invention to provide a single unit incorporating one of the pulleys of the transmission and such speed reducer.

It is a still further object of the invention to provide a single unit incorporating a pulley adapted to form the driven pulley of a variable ratio transmission, a speed reducer and means for varying the center distance between the transmission pulleys.

It is a still further object of this invention to provide a mechanism for adjusting the center distance between the pulleys of a variable ratio transmission, which is adapted for mounting on the driven shaft, and which incorporates a variable diameter pulley having resiliently urged sections.

This invention possesses many other advantages and has other objects which may be made more easily apparent from a consideration of several embodiments of the invention. For this purpose there are shown a number of forms in the drawings accompanying and forming part of the present specification. These forms will now be described in detail, illustrating the general principles of the invention; but it is to be understood that this detailed description is not to be taken in a limiting sense, since the scope of the invention is best defined by the appended claims.

Referring to the drawings:

Figures 3 and 4 are detail sections taken on correspondingly numbered lines of Figure 2;

Figure 5 is a diagrammatic view showing one adaptation of the invention in the low speed position;

Figure 6 is a similar view but showing the invention in high speed position;

Figure 7 is a diagrammatic view showing another adaptation of the invention in low speed position;

Figure 8 is a similar view but showing the invention in high speed position;

Figure 1:
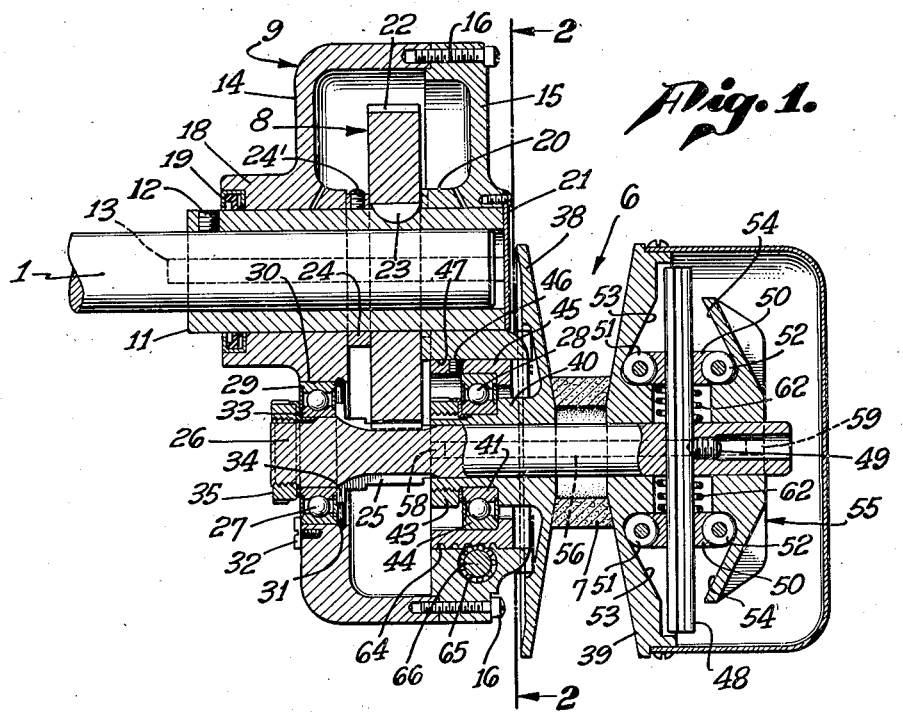
Figure 1 is a sectional view of one form of the invention.

Referring to Figures 5 and 6 of the drawings, a driven shaft forming an element of a machine which it is desired to operate at a variable speed, is indicated by the numeral 1. This shaft is rotatably supported in a frame 2. The shaft 1 is driven by a source of power 3, which may be an electric motor. The motor 3 is in fixed relation to the frame 2 and has a shaft 4 on which is mounted a pulley 5. The pulley 5 is operatively connected with a pulley 6 by a belt 7, the pulley 6 in turn being operatively connected with the shaft 1 by a gear train or speed reducer 8. As is well known in the art, the belt 7 is an edge active or V-belt, and one of the pulleys, for example the pulley 6, includes a pair of relatively axially adjustable pulley sections with opposed oppositely inclined faces which engage the sides of the belt. By moving the pulley sections toward each other, the belt is forced radially outwardly against the belt tension along the pulley faces, resulting in an increased effective pulley diameter. Conversely, by allowing the pulley sections to move apart, the belt moves radially inwardly along the pulley faces in response to the belt tension resulting in a decreased effective pulley diameter. To maintain the belt under suitable tension for adjusted positions of the pulley sections, the center distance between pulleys 5 and 6 is made variable. In the present instance this is accomplished by arranging the pulley 6 to swing radially about the driven shaft 1. For this purpose, a housing 9 is rotatably supported on the shaft 1, and encloses the gears 8 and supports the pulley 6. Further, means are provided whereby the power transmitted by the belt 7 is effective to urge an increase in this center distance, resulting in a decrease in effective pulley diameter and an increase in the transmission ratio. In opposition to this movement, means is provided resiliently opposing separation of the pulley sections. Thus, upon a reduction in the power transmitted, the pulley is urged to assume a larger effective diameter. Thus when the motor 3 is deenergized the pulley 6 assumes its maximum diameter, thus assuring that the transmission will be in its low speed position for starting. This housing 9 together with the gear train 8 and pulley 6 is arranged to be mounted as a unit on the shaft 1. In this way it is possible to provide a variable speed drive between a motor and a driven machine with only the addition of this unit, no changes in the motor or machine being required.

Figure 2:
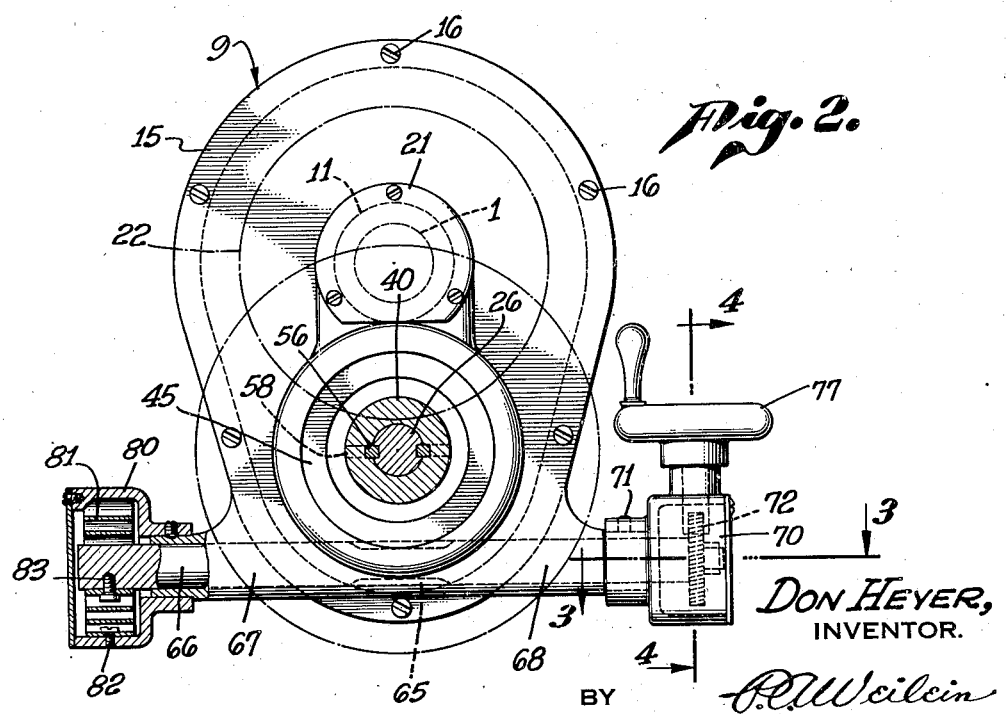
Figure 2 is a section taken on line 2—2 of Figure 1, showing the control mechanism.

For this purpose the gear housing 9 is rotatably mounted on a sleeve 11, fixed on the shaft 1 by a set screw 12 and key 13, for free angular movement about the axis of the shaft 1 (see Figures 1 and 2). The housing 9 comprises a pair of members 14 and 15 secured together as by screws 16 to form a chamber enclosing the gear train 8 and adapted to contain lubricant therefor. A suitable oil seal 19 is provided between the hub 18 of the housing member 14 and the sleeve 11 to prevent leakage of lubricant. The opening through the hub 20 of the member 15 at the other end of the housing is closed by a plate 21 suitably attached to the hub.

A driving gear 22 forming one member of the gear train 8 is secured on the sleeve 11 between the hubs 18 and 20 as by a key 23. A spacer 24 interposed between the hub 18 of the housing member 14 and one side of the gear 22 is secured to the sleeve 11 by a set screw 24'. The inner face of the hub 20 engages the opposite side of the gear 22; thus, the spacer 24 is effective to prevent axial displacement of either the gear 22 or the housing 9.

The housing 9 serves to mount the driving pinion and the adjustable diameter pulley mechanism. As shown in Figure 1, the pinion 25 is formed integrally on a shaft 26 which is rotatably supported in the housing 9 as by anti-friction bearing structures 27 and 28. The outer race 29 of the bearing 27 is secured in a suitable bore 30 in the housing member 14 as by a snap ring 31 and screws 32. The inner race 33 of the bearing 27 is clamped against a shoulder 34 formed on the shaft 26, by a lock nut 35. Thus, the bearing 27 secures the shaft 26 against axial movement with respect to the housing 9.

The load driving or driven pulley 6 is mounted on the shaft 26 immediately adjacent the housing 9. The pulley 6 is arranged to have a variable diameter and include a pair of pulley sections 38 and 39 mounted for axial movement on the shaft 26. These pulley sections have opposed oppositely inclined faces for engaging the belt 7. Means for adjusting the relative axial positions of these pulley sections is provided, whereby the effective pulley diameter is varied. For this purpose, the pulley section 38 is provided with a long hub 40 upon which is secured the inner race 41 of the anti-friction radial and thrust bearing 28, as by a lock nut 43 threaded on the hub 40. The outer race 44 of the bearing 28 is secured in a shouldered cup 45 in any convenient way, as by a set screw 46. The cup 45 is slideably mounted for axial movement of the shaft 26 in a suitable bore 47 formed in the housing section 15. The bearing 28 thus serves to rotatably support the shaft 26 and by appropriate adjustment to axially position the pulley section 38. Means to be presently described are provided for adjusting the axial position of the cup 45.

Means are provided for fixing the lateral position of the belt 7 axially of the shaft 26, and for maintaining this position fixed for all adjusted positions of the pulley sections 38 and 39. For this purpose a diametrically extending pin 48 is fixed in the shaft 26 adjacent the pulley section 39 as by a set screw 49. Centrifugal members or weights 50 are freely slidable along the pin 48, being suitably restrained against rotation thereon and carry rollers 51 and 52 at their opposite ends. The rollers 51 engage inclined surfaces 53 formed on the back of the pulley section 39, while the rollers 52 engage similar but oppositely inclined surfaces 54 formed on a member 55.

A pair of long keys or splines 56 are provided in the shaft 26 and engage the pulley sections 38 and 39 as well as the member 55 for insuring rotation of these elements with the shaft. Further, the keys 56 are provided with heads 58 and 59 at their opposite ends which respectively engage the pulley section 38 and the member 55 for restricting their axial separation. Brief consideration of Figure 1 will show that movement of the weights 50 outwardly along the pin 48 from the position shown will move the pulley section 39 to the left, at the same time moving the member 55, keys 56 and pulley section 38 to the right, resulting in an increased effective diameter of the pulley 6. To assist in such movement of the weights 50, springs 62 are confined between each of the weights and the shaft 26.

As so far described, the device operates as follows. When the motor 3 is energized, the pulley 5 rotates in a clockwise direction, such rotation being imparted to the pulley 6 by the belt 7, and thus to the shaft 26 and the pinion 25, pinion 25 in turn driving the gear 22, on the shaft 1. Due to the resistance to rotation of the shaft 1 imposed by the load to be driven, the pinion 25 has a tendency to move in a planetary or progressive manner along the surface of the gear 22 about the axis of the shaft 1. This urges the pulley 6 away from the pulley 5 as indicated by the arrow 63 in Figure 5. Since the length of the belt 7 is constant, this force urging increase in the center distance between the pulleys 5 and 6 results in increasing the belt tension above that normally required for driving the load which increased tension forces the pulley sections 38 and 39 of the pulley 6 apart against the force exerted by the centrifugal elements 50 and the springs 62 to cause a decrease in the effective diameter of the pulley 6.

Means are provided for limiting the separation of the pulley sections 38, 39 thereby controlling the effective diameter which the pulley 6 can assume in response to such force and setting the maximum speed ratio of the transmission. Thus, the lower part of the periphery of the cup 45 is provided with a plurality of gear teeth 64 forming a rack engaged by a pinion 65 rotatably mounted in the housing member 15. The pinion 65 is shown as formed on a control shaft 66 extending through the housing member 15 and rotatably mounted in extensions or hubs 67 and 68 extending from opposite sides of this member.

Means are provided for adjusting the control shaft 66. Thus, a small gear case 70 is secured on the outer end of the hub 68 as by a set screw 71 (see Figures 2, 3 and 4). Within the gear case 70, a worm wheel 72 is rotatably mounted on the reduced end portion 73 of the shaft 66, being retained thereon by a screw 74. The worm wheel 72 meshes with a worm 75 mounted on a shaft 76 rotatably supported by the case 70. A hand wheel 77 is provided for rotating the worm. The worm wheel 72 carries an axially extending pin 78, while the shaft 66 carries a radial pin 79 adapted to engage the pin 78, the pin 78 forming by adjustment of the worm wheel 72 an adjustable stop for the pin 79 and the shaft 66.

A similar case 80 is secured on the end of the hub or extension 67 and contains a flat spiral spring 81, one end of which is secured to the case as by a screw 82, the other end being secured to the shaft 66 by a screw 83. It will be apparent that due to the rack and pinion 64 and 65 connecting the cup 45 and the shaft 66, movement of the cup 45 and associated pulley section 38 in one direction will wind the spring 81, while movement of the cup and pulley section in the opposite direction will be assisted by the tension in the spring. It is to be understood that the spring 81 is so arranged as to oppose separation of the pulley sections 38 and 39 and thus be in assisting relation to the springs 62 and centrifugal elements 50.

With the transmission in operation, the pulley sections 38 and 39 are urged apart by the belt tension as previously described, causing axial movement of the cup 45 to the left and rotation of the shaft 66 in a counterclockwise direction (Figures 1 and 4) until the pin 79 engages the stop 78. This stops separation of the pulley sections 38, 39, thus fixing the effective diameter of the pulley 6 and the transmission ratio. By altering the position of the stop 78 by rotating the hand wheel 77, the effective pulley diameter and the transmission ratio may be readily controlled while the transmission is in operation. The rotation of the shaft 66 is opposed by the force of the spring 81. Thus this spring 81 acts in conjunction with the springs 62 to oppose separation of the pulley sections 38, 39 and maintain adequate tension on the belt 7. The torque or tendency of the variable-speed structure to rotate as a unit about the shaft 1 is greater than the combined forces exerted by the centrifugal elements 50 and springs 62 and 81. The control mechanism operated by the hand wheel 77 serves to fix the speed ratio by fixing the adjusted diameter of the pulley 6. Further, upon deenergization of the motor 3 so that the torque transmitted by the pinion 25 as well as the belt tension decreases, the force exerted by the springs 81 and 62 becomes effective to urge the pulley sections together, maintaining the belt under normal tension, increasing the effective pulley diameter and decreasing the center distance. Thus, as the transmission approaches standstill, it automatically assumes the low ratio position which is most favorable for starting the load. This also makes it possible to adjust the stop 78 so that the transmission when started will assume the desired ratio. The speed ratio can accordingly be adjusted for an increased or decreased ratio while the transmission is operating, and can also be preset when the transmission is not operating.

Obviously, with the device as just described, it is essential that the pulley 6 rotate in a direction to cause an increase in the center distance between this pulley and the driving pulley 5. This may not always be convenient, accordingly, in Figures 9, 10 and 11 a modified form of the invention is shown, wherein means are included which by appropriate adjustment permit rotation of the pulley 6 in either direction.

In this form of the device, a housing 109 similar to that of the first form is rotatably mounted on the shaft 110 of the driven machine and encloses a gear train 108 as before. This gear train 108 includes a pair of main gears 122 and 125, gear 125 being formed as a pinion on the shaft 126 rotatably supported in the housing 109 and carrying the adjustable diameter pulley 6, all arranged as in the first form.

Figure 9:
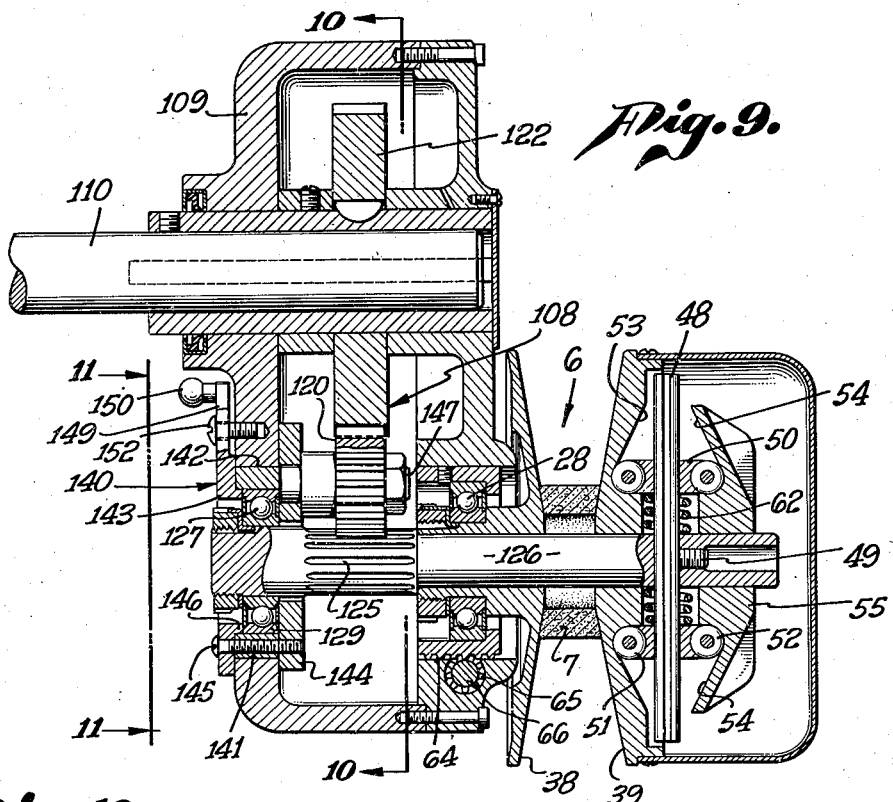
Figure 9 is a view similar to Figure 1, showing a modified form of the invention.
Figure 10:
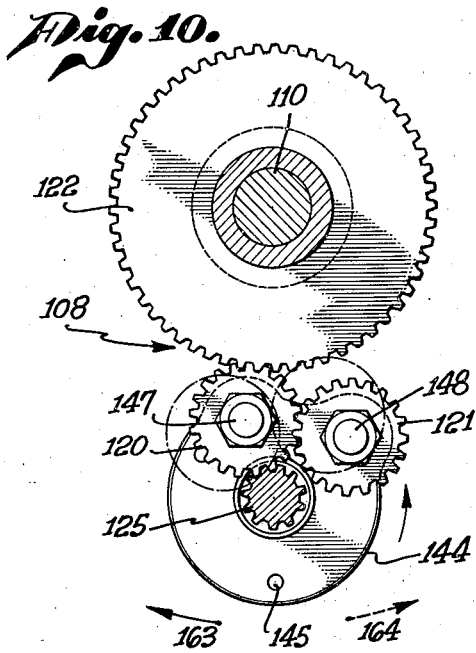
Figure 10 is a section taken on line 10—10 of Figure 9.
Figure 11:
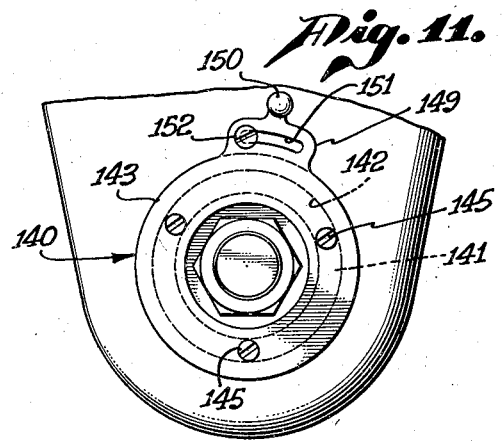
Figure 11 is a fragmentary elevation of the device of Figure 9 as seen from the left.

However, in this form, the gear or pinion 125 drives the gear 122 through optionally one or two idler gears 120 and 121 whereby, dependent upon whether one or both idlers are in use, rotation of the pulley 6 in one or the other direction will create a force urging an increase. Referring to Figure 9, it will be seen that the outer race 129 of the bearing 127 is supported in a member 140 arranged for limited rotation in a wall of the housing 109. This member 140 includes a central ring 141 rotatable in a suitable bore 142 in said wall which has plates 143 and 144 secured to its opposite faces as by screws 145. Bearing race 129 is clamped on the inner surface of the ring 141 between the plate 144 and the lip 146 in the plate 143. Idler gears 120 and 121 are rotatably mounted on the pins 147 and 148 suitably secured to the plate 144 and so positioned that the gear 120 meshes with the pinion 125 as well as with the gear 121, the gear 121 being clear of the pinion 125. These gears 120 and 121 are also so positioned that angular movement of the member 140 about the axis of the shaft 126 in one direction causes the idler 120 to engage the gear 122, as shown in Figure 10, while movement of the member 140 in the opposite direction frees the idler 120 from the gear 122 and causes the idler 121 to mesh therewith as indicated by the broken lines in Figure 10.

With the idler 120 engaging the gear 122, rotation of the pinion 125 in a counterclockwise direction will exert a force urging the assembly to swing clockwise about the shaft 110 as indicated by the arrow 163. If, however, the parts are adjusted so that the idler 121 engages the gear 122, counterclockwise rotation of the pinion 125 will cause the assembly to be urged in a counter-clockwise direction about the shaft 110 as indicated by the arrow 164. It will thus be apparent that by appropriate choice of the arrangement of idlers 120, 121 the device can be used with a prime mover 3 rotating in either direction and without regard to the relative positions of the prime mover 3 and the driven shaft 10.

To provide for convenient adjustment of the member 140 to place the proper idler in operative position, the plate 143 is provided with an extension 149 carrying an operating knob 150. To secure the parts in adjusted position the extension 149 is provided with an arcuate slot 151, through which passes a clamping screw 152, threadedly engaging the wall of the case 109. The screw 152 also serves as a stop pin cooperating with the slot 151 to position the plate 143. The slot 151 is of such length and is so located with respect to the screw 152 and the gears 120, 121, that when one extremity of the slot engages the screw 152 the idler 120 will be properly meshed with the gear 122, and when the other extremity engages the screw 152 the idler 121 will be properly engaged.

I claim:

1. In a variable ratio transmission having a driving pulley and a load driving pulley with a variable center distance and operatively connected by a belt, one of said pulleys having a pair of relatively axially movable pulley sections with opposed oppositely inclined belt engaging faces forming by relative axial adjustment variable effective pulley diameters, and wherein the adjusted effective pulley diameter is a function of the center distance, means adapted to connect one of said pulleys in driving relation with a shaft, said connecting means including means responsive to variation in the torque exerted by one of said pulleys for causing adjustment of said movable pulley sections.

2. In a variable ratio transmission having a driving pulley and a load driving pulley with a variable center distance and operatively connected by a belt, one of said pulleys having a pair of relatively axially movable pulley sections with opposed oppositely inclined belt engaging faces forming by relative axial adjustment variable effective pulley diameters, means adapted to connect one of said pulleys in driving relation with a shaft, said connecting means including means responsive to variation in the torque exerted by one of said pulleys for causing adjustment of said variable pulley diameter, and means continuously urging change of said pulley diameter in one direction.

3. In a variable ratio transmission having a driving and a load driving pulley with a variable center distance and operatively connected by a belt, one of said pulleys having a pair of relatively axially movable pulley sections with opposed oppositely inclined belt engaging faces forming by relative axial adjustment variable effective pulley diameters, and wherein the adjusted effective pulley diameter is a function of the center distance, means adapted to connect one of said pulleys in driving relation with a shaft, said connecting means including means responsive to the torque exerted by one of the pulleys for varying the center distance, whereby the effective pulley diameter is adjusted.

4. In a variable ratio transmission having a driving pulley and a load driving pulley with a variable center distance and one of said pulleys having a pair of relatively axially movable pulley sections with opposed oppositely inclined belt engaging faces forming by relative axial adjustment variable effective pulley diameters, and wherein the adjusted effective pulley diameter is a function of the center distance, means resiliently urging a change in the effective pulley diameter in one direction, and means adapted to connect one of said pulleys in driving relation with a shaft, including torque responsive means for changing the effective pulley diameter in the opposite direction.

5. In a variable ratio transmission having a driving pulley and a load driving pulley operatively connected by a belt, said load driving pulley having a pair of relatively axially movable pulley sections with opposed oppositely inclined belt engaging faces forming by relative axial adjustment variable effective pulley diameters, means mounting one of said pulleys for movement in a direction to vary the center distance, the adjusted pulley diameter being a function of the center distance, and means adapted to connect one of said pulleys in driving relation with a shaft, including means operated by the torque of one of said pulleys for urging said movably mounted pulley to move in a direction to increase the center distance.

6. In a variable ratio transmission having a driving pulley and a load driving pulley operatively connected by a belt, one of said pulleys having a pair of relatively axially movable pulley sections with opposed oppositely inclined belt engaging faces forming by relative adjustment variable effective pulley diameters, a shaft, means mounting one of said pulleys for swinging movement about said shaft whereby to vary the center distance between the pulleys and adjust the effective pulley diameter, gearing operatively connecting said one pulley and said shaft, transfer of power by said gearing urging said one pulley to swing in a center distance increasing direction whereby to decrease said effective pulley diameter, and means resiliently opposing said decrease in diameter.

7. In a variable ratio mechanism, a frame, means rotatably supporting the frame and adapted for mounting on a shaft, a variable diameter pulley structure rotatably supported by said frame and spaced radially from said means, said pulley structure being adapted to be engaged by an edge active belt and having a pair of relatively axially movable pulley sections with opposed oppositely inclined belt engaging faces forming by relative axial adjustment variable effective pulley diameters, means operatively connecting said pulley and said supporting means and urging the frame rotatably about said means in response to transfer of torque between the pulley and said means, whereby to vary the tension of said belt and cause movement of the frame about said means, and means operating on said pulley structure maintaining said belt tension substantially constant over a chosen range of movement of said frame.

8. In a variable ratio mechanism, a frame, means rotatably supporting said frame and adapted for mounting on a shaft, a variable diameter pulley structure rotatably supported by the frame and spaced radially from said means, said pulley being adapted to be engaged by a belt under normal tension, means operatively connecting the pulley and said supporting means, and causing rotary movement of the frame about said means in response to application of torque to the pulley whereby to alter the tension of said belt from normal, means whereby the effective pulley diameter is adjusted to restore normal tension in the belt, and means carried by the means connecting the pulley and the supporting means for optionally controlling the direction of movement of the frame in response to said torque.

9. In a variable ratio mechanism, a frame, means rotatably supporting said frame and adapted to be mounted on a shaft, a pulley structure rotatably supported by the frame and spaced radially from said means, and a gear train operatively connecting the pulley and said means, including a pair of oppositely rotating idlers adapted to be selectively in driving relation with said means, transfer of torque through the gear train urging said frame to move angularly about said means carried by said frame, in accordance with the selected idler.

10. In a variable ratio mechanism, a frame, means rotatably supporting said frame and adapted to be mounted on a shaft, a pulley structure rotatably supported by the frame and spaced radially from said means, a gear train operatively connecting the pulley and said means, transfer of torque through the gear train urging said frame to move angularly about said means, and speed responsive means controlling the extent of movement of the frame.

11. In a variable ratio mechanism, a frame, means rotatably supporting said frame and adapted to be mounted on a shaft, a pulley structure rotatably supported by the frame and spaced radially from said means, and a gear train operatively connecting the pulley and said means, transfer of torque through the gear train urging said frame to move angularly about said means, said gear train including a reversing gear for optionally controlling the direction of movement of the frame.

12. In a variable ratio mechanism including a variable diameter pulley structure adapted to be engaged by an edge active belt and including a pair of relatively axially movable pulley sections with opposed oppositely inclined belt engaging faces, forming by relative axial adjustment variable effective pulley diameters, means for axially positioning one of said pulley sections including a rotary control shaft, means for forming an adjustable stop for limiting rotation of said shaft in one direction, and means resiliently urging rotation of said shaft in the opposite direction.

13. In a variable ratio mechanism including a variable diameter pulley structure adapted to be engaged by an edge active belt and including a pair of relatively axially movable pulley sections with opposed oppositely inclined belt engaging faces, forming by relative axial adjustment variable effective pulley diameters, a non-rotary cup axially secured to one of said sections and rotatable with respect thereto, a rotary control shaft extending transversely of the pulley axis, means forming a rack and pinion connection between said cup and said shaft, means for resiliently urging said pulley sections together, and positive means for relatively adjusting said pulley sections in one direction.

14. In a variable ratio mechanism including a variable diameter pulley structure adapted to be engaged by an edge active belt and including a pair of relatively axially movable pulley sections with opposed oppositely inclined belt engaging faces, forming by relative axial adjustment variable effective pulley diameters, a non-rotary cup axially secured to one of said sections and rotatable with respect thereto, a rotary control shaft extending transversely of the pulley axis, means forming a rack and pinion connection between said cup and said shaft, means for resiliently adjusting said pulley sections in one direction, and means for positively adjusting said pulley sections in the same direction.

15. In a variable ratio mechanism, a frame adapted to be rotatably mounted on a shaft, a variable diameter pulley structure rotatably supported by the frame, said pulley structure including a pair of relatively axially movable pulley sections with opposed oppositely inclined belt engaging faces, forming by relative axial adjustment variable effective pulley diameters, means for axially positioning one of said pulley sections including a control shaft rotatably carried by said frame, means forming an adjustable stop for limiting rotation of said control shaft in one direction, and means resiliently urging rotation of the control shaft in the opposite direction.

16. In a variable ratio mechanism, a frame, means rotatably supporting said frame and adapted to be mounted on a shaft, a pulley structure rotatably supported by the frame and spaced radially from said means, a gear train operatively connecting the pulley and said means, transfer of torque through the gear train urging said frame to move angularly about said means, said gear train including a pair of main gears, a pair of idler gears constantly meshed with each other, movable means rotatably supporting said idler gears with one of said idlers constantly meshing with one of said main gears, and means for adjusting said movable support so that either idler gear optionally meshes with the other main gear, whereby to control the direction of movement of the frame.

DON HEYER.

REFERENCES CITED

The following references are of record in the file of this patent:

UNITED STATES PATENTS

| Number | Name | Date |
| --- | --- | --- |
| 2,200,101 | Schmitter | May 7, 1940 |
| 2,260,795 | Burns | Oct. 28, 1941 |
| 2,294,777 | Heyer | Sept. 1, 1942 |
| 2,193,251 | Johnson | Mar. 12, 1940 |

FOREIGN PATENTS

| Number | Country | Date |
| --- | --- | --- |
| 435,257 | Great Britain | Sept. 18, 1935 |